Aug. 10, 1965   J. H. BERTIN ETAL   3,199,506
DEVICE FOR CLEARING WIDE ROADS OR RUNWAYS
COVERED WITH SNOW AND ICE
Filed Feb. 27, 1963

INVENTORS
John Henri Bertin,
Ernest Dubois

BY Stevens, Davis, Miller & Mosher
ATTORNEYS

3,199,506
**DEVICE FOR CLEARING WIDE ROADS OR RUN-
WAYS COVERED WITH SNOW AND ICE**
Jean Henri Bertin, Neuilly-sur-Seine, and Ernest Dubois,
Fontenay-aux-Roses, France, assignors to Société Bertin
& Cie, Paris, France, a company of France
Filed Feb. 27, 1963, Ser. No. 261,462
Claims priority, application France, Mar. 3, 1962,
889,900
1 Claim. (Cl. 126—271.2)

The great energy of turbojet engine exhaust gases and especially the thermal aspects of this energy have led to suggestions that such an engine be used to remove water deposited in the form of ice or snow on roads, airport runways, and the like.

This invention makes it possible to use both the calorific energy and the momentum of the hot gas generated by a turbojet developing adequate thrust, for driving well clear, in transverse directions, any water that may cover a track, or an aircraft runway in particular, under different forms. It is possible in this way to clear large areas rapidly, and more particularly to clear in a single pass a runway width sufficient to enable a heavy aircraft to land.

With a view to utilizing the momentum of the hot gas without the thrust of the turbojet producing it becoming troublesome, and with a view also to directing said gas transversely without leaving an unswept central area, the jet pipe of said turbojet branches out into at least two curved ducts the outlets of which are positioned adjacent the ground, substantially transversely and facing each other in front view, but slightly offset in lateral view a certain gap being possibly provided between said outlets (when the device is viewed from the front) in order to produce a degree of overlap of the paths swept on the ground by the hot gas jets.

Such an arrangement allows for reducing the mechanical effects of the thrust developed by the turbojet to a relatively small torque. In accordance with this invention, such an arrangement is combined with a jet deflection system of any type well known per se, examples being a mechanical or a purely aerodynamic system. In one design illustrated by way of example, an aerodynamic deflection system is carried by the two ducts referred to precedingly, adjacent their outlets. Auxiliary nozzles are each supplied with compressed air flowing at a suitable rate, thereby allowing for controlling the orientation of each main jet and its point of impact on the ground, for range and direction alike. Such a system, which is particularly sturdy, will thus enable the driver of a device according to this invention that is travelling at uniform speed to clean a given runway area more lengthily, to project in the most convenient way the water being cleared from the runway, and even to impart an alternating sweeping motion to the jets.

In accordance with one specific embodiment of this invention, a turbojet having a thrust of at least 2500 kilograms is disposed longitudinally on a platform which is supported on wheels of which a number are steerable. The jet pipe of the turbojet extending horizontally along the fore-and-aft axis of said platform branches out into two curved ducts supported by said platform. The various supply and control means are likewise supported on the platform, and said platform is so coupled to the side of a motor vehicle by vertically deformable means that the hot gas exhaust outlets be positioned ahead of said vehicle.

The motor vehicle and the platform attached to its right or its left thus always travel over ground that has already been cleared and are consequently in no danger of skidding. The controls preferably embody flexible transmission systems, so that the driver can remain in the cab of the towing vehicle.

The description which follows with reference to the accompanying drawings, which are filed by way of example only and not of limitation, will give a clear understanding of the various features of the invention and of the method of carrying them into practice.

In the drawings filed herewith:

Figure 1:
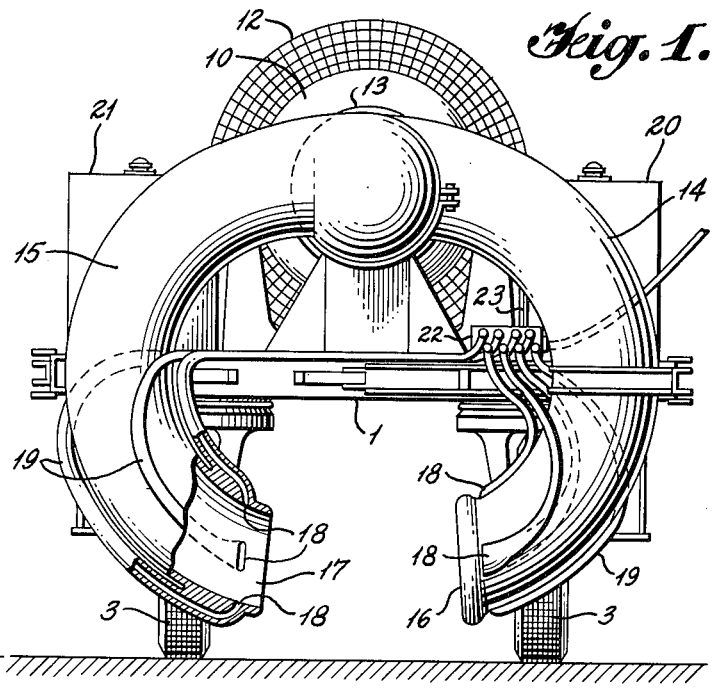
FIGURE 1 is an enlarged front view in fragmental section of the curved ducts extending the turbojet pipe and carrying deflecting nozzles supplied with compressed air.
Figure 2:
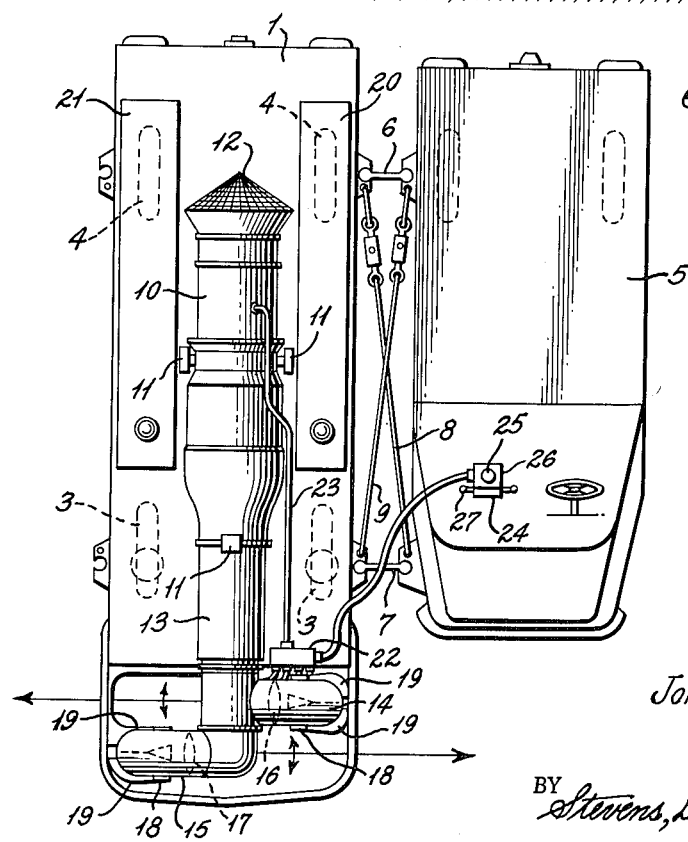
FIGURE 2 is a schematic plan view of a device according to this invention, coupled to the right of a towing vehicle.

Referring to the drawings, there is shown thereon a platform 1 supported on wheels 3, 4 and coupled to a towing vehicle 5 by preferably swivel-jointed links 6, 7 braced longitudinally by diagonally disposed ropes 8, 9.

The rear wheels 4 are aligned and parallel with the rear wheels of towing vehicle 5, while the front wheels 3 are designed to castor.

A turbojet 10 is supported horizontally by the platform, on attachments 11. Its air intake is provided with a protective grid 12 and its jet pipe 13 extends forward.

Said jet pipe branches out into two approximately semi-circular ducts 14, 15, the axes of which lie in transverse planes that are slightly offset relative to each other in the longitudinal direction. The outlets 16, 17 of said ducts have their axes located at a small distance above the ground and possibly slightly inclined towards the same.

Blowing nozzles 18 are carried by ducts 14, 15 adjacent their outlets 16, 17 which nozzles preferably number four per outlet, being spaced 90° apart and supplied with compressed air through lines 19 connected to an air bleed on the turbojet located downstream of the compressor.

Platform 1 additionally supports fuel tanks 20, 21 together with the turbojet control and, possibly, starting devices.

The system for deflecting the hot jets issuing from outlets 16, 17 and sweeping the runway or road transversely, ahead of the platform and the towing vehicle, comprises, in addition to nozzles 18, a compressed air distributor 22 fed through a line 23 and preferably operated by a Bowden cable-type control from the cab of towing vehicle 5.

By way of example, the driver of such a cleaning device would be provided with a light removable console 24 mounting an engine throttle control 25 and two small levers 26 and 27 for directional control of the gas jets issuing from outlets 16, 17.

With the motor vehicle slowly towing the device along the axis of an aircraft runway, it would thus be possible to expel in a single pass the snow and ice to either side of a strip about 50 meters wide that would remain dry for all practical purposes after passage of the device and would not be in danger of icing up again immediately. The towing vehicle and the platform harnessed to it consequently travel over dry ground and are not in danger of skidding. The torque generated by the offset gas ejection outlets is well below the torque required to overcome the frictional adhesion of the platform to the ground, irrespective of the fuel load in the tanks.

The driver of such a device can direct the hot jets issuing from outlets 16 and 17 so that they are concentrated on the iciest areas and so that any agglomerates detached from the ground are thrown well clear. Thus it will be appreciated that this invention utilizes both the heat and the momentum of the jets.

Figure 3:
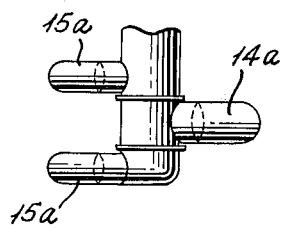
FIGURE 3 is a plan view of an alternative embodiment of the ejection device.

Referring next to FIGURE 3, the embodiment shown thereon comprises two curved ducts 15a positioned on either side of a duct 14a of twice their cross-sectional area, the outlet of which is directed in the opposite direction to theirs. This alternative method of construction allows for cancelling out not only the transverse thrust, as in the embodiment described precedingly, but also any residual torque exerted on the device.

It is of course to be understood that this invention is by no means limited to the specific embodiments hereinbefore described, but that its scope also extends to such embodiments as may be devised by resorting to equivalent technical means; by way of example, the shape of the ducts could be other than substantially semi-circular.

What we claim is:

A device to clear a wide strip along the ground by using hot gas jets to expel water, snow and ice away and to dry said strip, comprising, in combination, a turbojet engine having an air compressor, wheeled motor vehicle means for supporting and moving said turbojet engine along said strip, a jet pipe connected to said turbojet engine and disposed ahead of said vehicle means, at least two curved ducts, said jet pipe branching out into said ducts, said ducts having outlets positioned adjacent the ground and substantially transversely with respect to said vehicle means, said outlets facing each other in front view and being slightly offset in lateral view, a plurality of deflecting nozzles arranged around said outlets, distributing means controllable by an operator, and supply lines connecting said distributing means to the respective deflecting nozzles and to the engine air compressor, whereby compressed air can be selectively supplied to any one of said nozzles and deflect the exhaust gas issuing from said adjacent curved ducts.

References Cited by the Examiner

UNITED STATES PATENTS

| | | | |
|---|---|---|---|
| 600,106 | 3/98 | White et al. | 126—271.2 X |
| 1,408,471 | 3/22 | Ricks | 126—271.2 X |
| 2,494,720 | 1/50 | Richards | 126—271.2 |
| 2,531,884 | 11/50 | McLemore | 126—271.2 |
| 2,802,286 | 8/57 | Wylie | 37—19 |
| 3,041,748 | 7/62 | Wetzel | 126—271 X |

FOREIGN PATENTS

| | | |
|---|---|---|
| 1,191,114 | 4/59 | France. |
| 190,146 | 7/23 | Great Britain. |
| 410,784 | 3/34 | Great Britain. |

JAMES W. WESTHAVER, *Primary Examiner.*

PERCY L. PATRICK, *Examiner.*